Aug. 12, 1924.                                                                1,504,402
C. H. VESSOT ET AL
CONVEYING AND BINDING MECHANISM FOR FLAX PULLING MACHINES
Filed March 24, 1922        2 Sheets-Sheet 2

INVENTORS.
CHARLES. H. VESSOT.
CHARLES. U. VESSOT.
GEORGE. A. PILKEY..

BY Fetherstonhaugh & Co
ATTYS.

Patented Aug. 12, 1924.

1,504,402

UNITED STATES PATENT OFFICE.

CHARLES HENRI VESSOT AND CHARLES ULYSSES VESSOT, OF OTTAWA, AND GEORGE ALVIN PILKEY, OF CORUNNA, ONTARIO, CANADA.

CONVEYING AND BINDING MECHANISM FOR FLAX-PULLING MACHINES.

Application filed March 24, 1922. Serial No. 546,489.

*To all whom it may concern:*

Be it known that we, CHARLES HENRI VESSOT, CHARLES ULYSSES VESSOT, and GEORGE ALVIN PILKEY, all subjects of the King of Great Britain, the two former being residents of the city of Ottawa, in the Province of Ontario and Dominion of Canada, and the latter a resident of the town of Corunna, in the said Province of Ontario, have invented certain new and useful Improvements in Conveying and Binding Mechanism for Flax-Pulling Machines, of which the following is a specification.

This invention relates to improvements in conveying and binding mechanism for flax pulling machines, and is a continuation in part of the application for improvements in flax harvesting machines filed by us on January 29, 1920, under Serial No. 355,005; the present application relating principally to the conveying and binding mechanism which operate on the flax plants after they have been pulled by the flax pulling belts.

The objects of the invention are to enable the flax plants to be bound into shocks while they are in a vertical position and to later convey them to a point desired.

Further objects are generally to improve and simplify the construction of the device to better adapt the various parts to perform the functions required of them.

And it consists essentially of the improved construction hereinafter described in detail in the accompanying specifications and drawings.

In the drawings.

In the drawings, like characters of reference indicate corresponding parts in all the figures.

Figure 1:
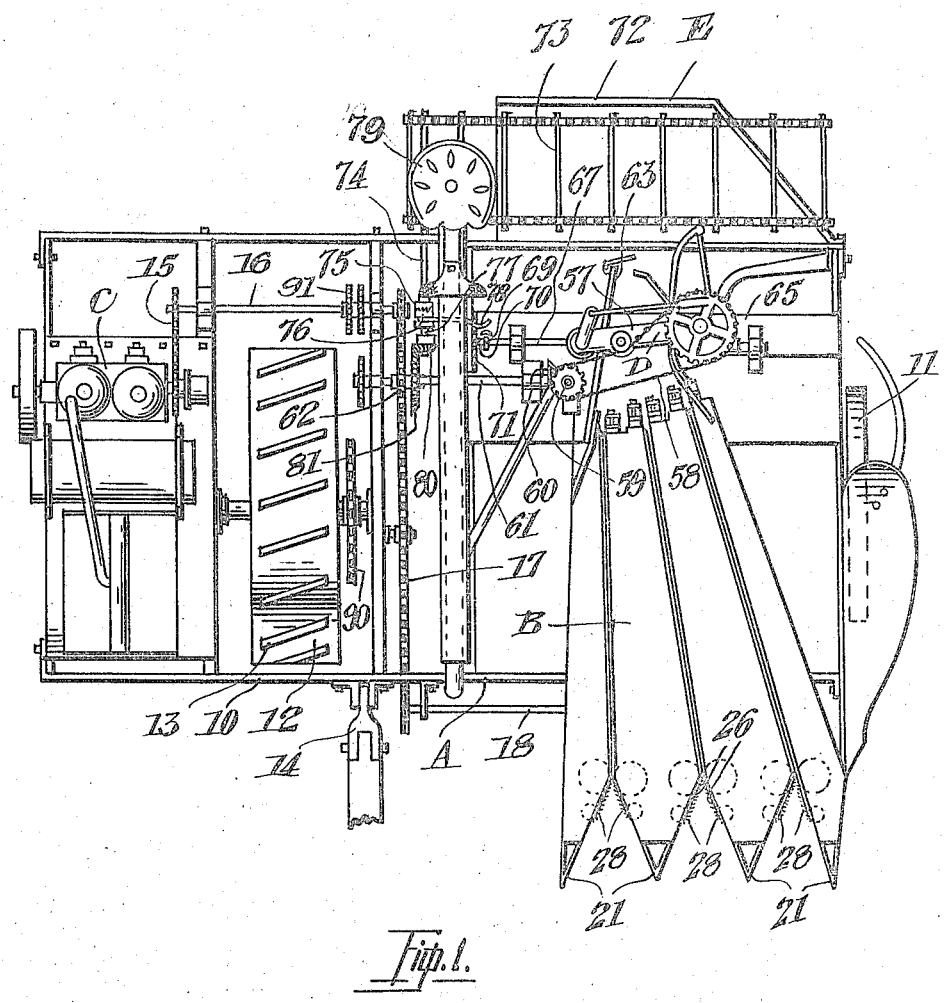
Figure 1 is a plan view of an embodiment of the invention.
Figure 2:
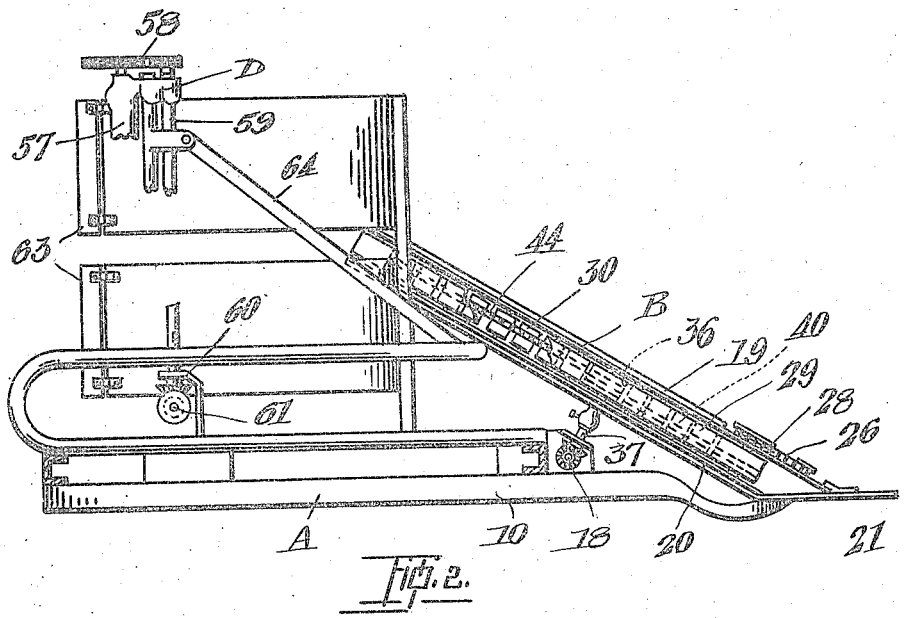
Figure 2 is a fragmentary end elevation of the machine, the wheels being removed.
Figure 3:
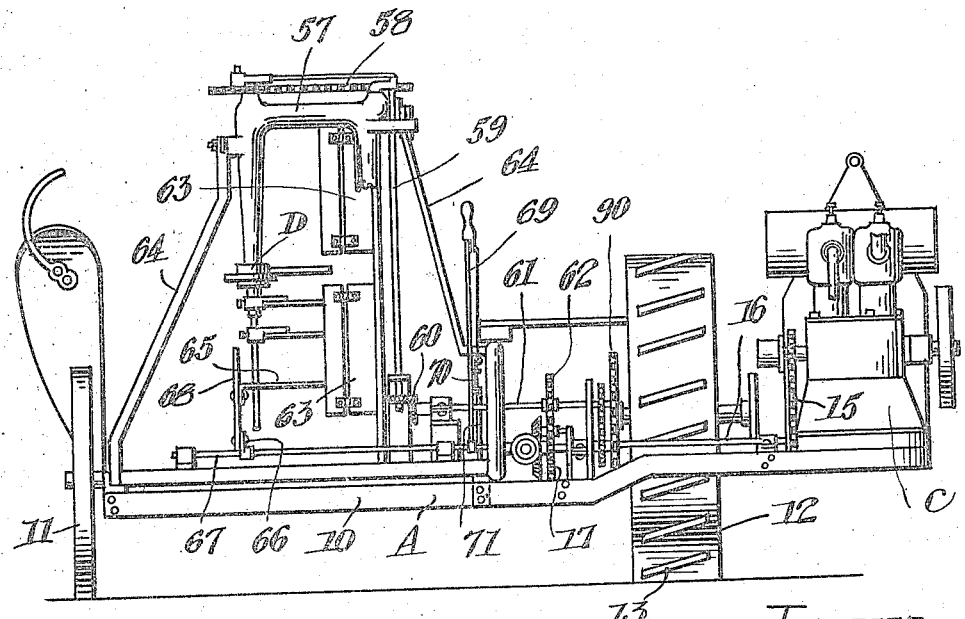
Figure 3 is a rear view of the machine, the sheaf carrier being removed for the sake of clarity.

Referring to the drawings:

A represents the improved flax pulling machine comprising a frame 10 which, in the embodiment illustrated, is substantially rectangular and of the binder type, the said frame being provided with ground and bull wheels 11 and 12, the latter of which carry peripheral cleats 13, so that the tractive power will be increased when the machine is being driven forwardly. On the front of the frame 10 intermediate of the breadth thereof, a tongue attachment 14 is provided, thus allowing horse traction to be readily attached to the machine to give the driving power.

On the frame 10 the pulling elements B are mounted and are arranged to one side of the frame, and at the opposite side of the frame a prime mover C such as a gas engine is suitably secured. This prime mover or gas engine is operatively connected by a chain drive 15 with a shaft 16 which is journalled transversely of the frame 10, the said shaft being connected by a chain drive 17 to a shaft 18, which is designed to transmit the required power to the pulling elements B.

Each of the pulling elements B consists of an angularly disposed frame formed with upper and lower walls 19 and 20 formed of angle members and suitably spaced to maintain them in the desired relation to each other. The lower ends of these frames are connected to a share or divider 21.

The pulling elements mounted within the frames comprise contacting pulling belts 29 supported on rollers 30, the pulling belts being supported and driven from a sprocket chain 44 extending beneath them, all mounted and arranged as shown in my aforesaid application, Serial No. 355,005.

It will be observed that the flax pulling belts converge towards each other from the front to the rear, so that the flax plants being raised vertically by the belts will also converge towards each other and be delivered to the binding mechanism at the rear. After the flax is delivered from the rear end of the pulling belts, it comes within the reach of the packing arms of the knotter D.

The knotter D is arranged with its frame 57 vertically disposed and the packing arms thus revolve in a horizontal plane as also the needle, and the knotter is connected by the chain drive 58 to the vertically disposed shaft 59 which is driven by the intermeshing gears 60 rotated by the shaft 61, which is provided with a sprocket wheel 62 engaging with the main drive chain 17.

The deck 63 upon which the sheaves are delivered from the rear of the pulling elements is vertically disposed and is arranged adjacent to the packing arms and knotter D, so that the flax, as it comes from the pulling elements, is maintained vertically and is retained in this position on engagement with the deck and the packing arms. The knotter D is fixed and is supported from the frame 10 by suitable braces 64.

As the flax leaves the rear end of the pulling elements, the butts are engaged by an adjustable frame 65 located adjacent to the knotting mechanism and this frame is connected at the lower end to a crank member 66 carried by the shaft 67, so that the frame 65 will be elevated or lowered on the rotation of the said shaft.

The frame 65 is formed with end standards 68 which are slidably supported on the frame 10. The shaft 67 is manually controlled by a lever 69 provided with a detent 70 coacting with a quadrant 71, so that the said shaft may be retained in any desired position, and thus the adjustment of the platform 65 is maintained.

The lever 69 will be located at the point adjacent to the driver's seat and so facilitate the actuating of the said lever.

When the flax has been tied into a sheaf it is deposited on the horizontal carrier E located at the rear of the frame 10 until the desired number of sheaves have been collected to form a stock, whereupon the said carrier is operated to discharge the sheaves. The carrier E coacts with a platform 72 on which the sheaves lie and as the slats 73 of the carrier engage with the said sheaves they move them along the platform and discharge them over the end thereof. The carrier E may be of a type commonly used in practice and is driven from the shaft 74 which is provided at one end with a clutch jaw 75 adapted to engage with the clutch jaw 76 carried by the shaft 77.

The clutch jaw 76 is movable and provided with a foot lever 78 located adjacent to the driver's seat 79, so that the driver can readily throw the clutch jaw 76 into engagement with the clutch jaw 75 and so render the carrier E operative.

The shaft 77 is provided with a beveled gear 80 which meshes with a gear 81 carried by the shaft 61, so that the said carrier is operated from the main driving chain 17.

To obtain the proper sheaf it is necessary that the flax should be tied at a certain point intermediate of its length, and as the flax leaves the pulling belts 29, it is inclined to drop a little before it reaches the deck 63, so that, if the flax happens to be a little shorter than usual, the sheaf is not tied in the proper manner. To overcome this difficulty we have provided means whereby the platform 65 may be adjusted vertically, so that when it is set to suit the flax being pulled, each sheaf will be tied in the exact position to give the best results.

When a machine of this description is in use, the platform 65 is first fixed and as the machine is being drawn forwardly by means of horse traction, the flax is gathered by the teeth 28 of the flexible members 26 and thus fed to the pulling belts 29 which engage and pull the flax.

During the forward motion of the machine, the prime mover C is started and motion is transmitted through the chain 15 and shaft 16 chain drive 17, shaft 18, to the angularly disposed shafts 37 which drive the pulling belts 29 and gathering members 26.

As the flax is delivered from the rear end of the pulling elements B, the butts are supported by the adjustable frame 65 and the packing arms gather the flax together when it is engaged by the knotting mechanism and tied into the form of a sheaf, the said sheaf being thrown or delivered to the platform 72 at the rear of the frame 10.

When the desired number of sheaves have been collected on the platform 72, the driver actuates the foot lever 78 throwing the clutch jaw 76 into engagement with the clutch jaw 75 thereby actuating the carrier E which discharges the said sheaves which may then be set up in the form of a stock.

Should it be desired to dispense with the use of this prime mover, the driving force may be taken from the bull wheels 12 by providing a sprocket 90 on the axle of the said wheel and providing a sprocket 91 on the shaft 16 and these sprockets will then be connected by means of a chain drive so that, during the forward motion of the machine, motion will be transmitted from the bull wheel 12 through the said chain to the shaft 16, and thus through the chain drive 17 to the pulling elements B in the manner above described.

As many changes could be made in the above construction, and many apparently widely different embodiments of our invention within the scope of the claims, constructed without departing from the spirit or scope thereof, it is intended that all matter contained in the accompanying specification and drawings shall be interpreted as illustrative and not in a limiting sense.

What we claim as our invention is:

1. A flax pulling machine comprising contacting pulling belts adapted to lift the flax plants vertically, said belts converging towards each other at the rear end, vertically disposed binding mechanism adapted to bind the flax plants into shocks while in a vertical position, and means for supporting the shocks while in such vertical position.

2. A flax pulling machine comprising contacting pulling belts adapted to lift the flax plants vertically, said belts converging towards each other at the rear end, vertically disposed binding mechanism adapted to bind the flax plants into shocks while in a vertical position, means for supporting the shocks while in such vertical position, and a horizontal conveyer adapted to convey the shocks away from the binding mechanism.

3. In a flax puller, in combination, a flax pulling belt, vertically arranged binding mechanism adapted to bind the flax plants into shocks while in a vertical position, and a horizontally extending conveyer adapted to receive the shocks from the binding mechanism.

4. In a flax puller, in combination, a flax pulling belt, vertically arranged binding mechanism adapted to bind the flax plants into shocks while in a vertical position, a horizontally extending conveyer adapted to receive the shocks from the binding mechanism, the said conveyer comprising a platform and endless chains formed with connecting slats adapted to move over the platform.

5. In a flax harvesting machine, pulling belts, vertically arranged binding mechanism, and an adjustable platform adapted to support the butts of the plants while in the binding mechanism.

6. In a flax harvesting machine, pulling belts, vertically arranged binding mechanism, an adjustable platform adapted to support the butts of the plants while in the binding mechanism, and means for adjusting the platform including cranks operatively connected thereto, and a hand lever operatively connected to the cranks.

7. In a flax puller, in combination, converging flax pulling belts, vertically arranged binder decks adapted to engage the flax plants when they come from the flax pulling belts, packer arms and knotting mechanism arranged co-operatively with the binder decks and adapted to bind the flax plants into shocks.

8. In a flax puller, in combination, converging flax pulling belts, vertically arranged binder decks adapted to engage the flax plants when they come from the flax pulling belts, packer arms and knotting mechanism arranged co-operatively with the binder decks and adapted to bind the flax plants into shocks, and a platform supporting the butts of the flax plants while being bound into shocks.

9. A flax pulling machine comprising converging pulling belts, vertically arranged binder mechanism, and a transversely extending carrier mounted at the rear of the binder mechanism adapted to receive and carry the shocks to one side of the machine.

10. A flax pulling machine comprising converging pulling belts, vertically arranged binder mechanism, and a transversely extending carrier mounted at the rear of the binder mechanism adapted to receive and carry the shocks to one side of the machine and means for actuating the carrier independently of the binding mechanism.

In witness whereof we have hereunto set our hands.

CHARLES HENRI VESSOT.
CHARLES ULYSSES VESSOT.
GEORGE ALVIN PILKEY.